United States Patent [19]

Ralston et al.

[11] 4,161,253

[45] Jul. 17, 1979

[54] CARRIER AND DISPENSER FOR CYLINDRICAL BALES

[75] Inventors: Horace E. Ralston, Millington; Edward L. Robinson, Jr., Memphis, both of Tenn.; William K. Ralston, deceased, late of Cordova, Tenn., by Louise Ralston, executor

[73] Assignee: International Harvester Company, Chicago, Ill.

[21] Appl. No.: 825,009

[22] Filed: Aug. 16, 1977

[51] Int. Cl.² ............................................. B66F 9/19
[52] U.S. Cl. ..................................... 414/25; 414/911; 242/86.5 R
[58] Field of Search ............. 214/1 HA, 653, DIG. 4, 214/130 C; 242/86.5 R

[56] References Cited

U.S. PATENT DOCUMENTS

| | | | |
|---|---|---|---|
| 2,601,933 | 7/1952 | Seagraves et al. | 214/653 |
| 2,775,359 | 12/1956 | Carpenter | 214/653 |
| 3,968,940 | 7/1976 | Godberson | 214/1 HA |
| 4,025,006 | 5/1977 | Turnbow | 214/1 HA |

Primary Examiner—Francis S. Husar
Assistant Examiner—Ross Weaver
Attorney, Agent, or Firm—Neal C. Johnson; F. David AuBuchon

[57] ABSTRACT

A tractor-mounted carrier and dispenser for a cylindrical bale of substantial size and weight. The carrier includes a pair of cantilevered rollers spaced apart in parallel relation to hold a cylindrical bale thereon. The rollers are power-movable toward and away from each other to facilitate lifting a bale from the ground. The rollers are powered in rotation to rotate a bale thereon for progressively feeding hay from the bale onto the ground between rollers. The rollers are moved toward each other to continuously support the bale as it decreases in diameter. Controls permit the operator to vary the rotation speed of the rollers relative to each other to create a peripheral shreading or tearing action to enhance the feeding of the bale. The carrier of the invention is also readily capable of transporting a bale from point to point.

2 Claims, 4 Drawing Figures

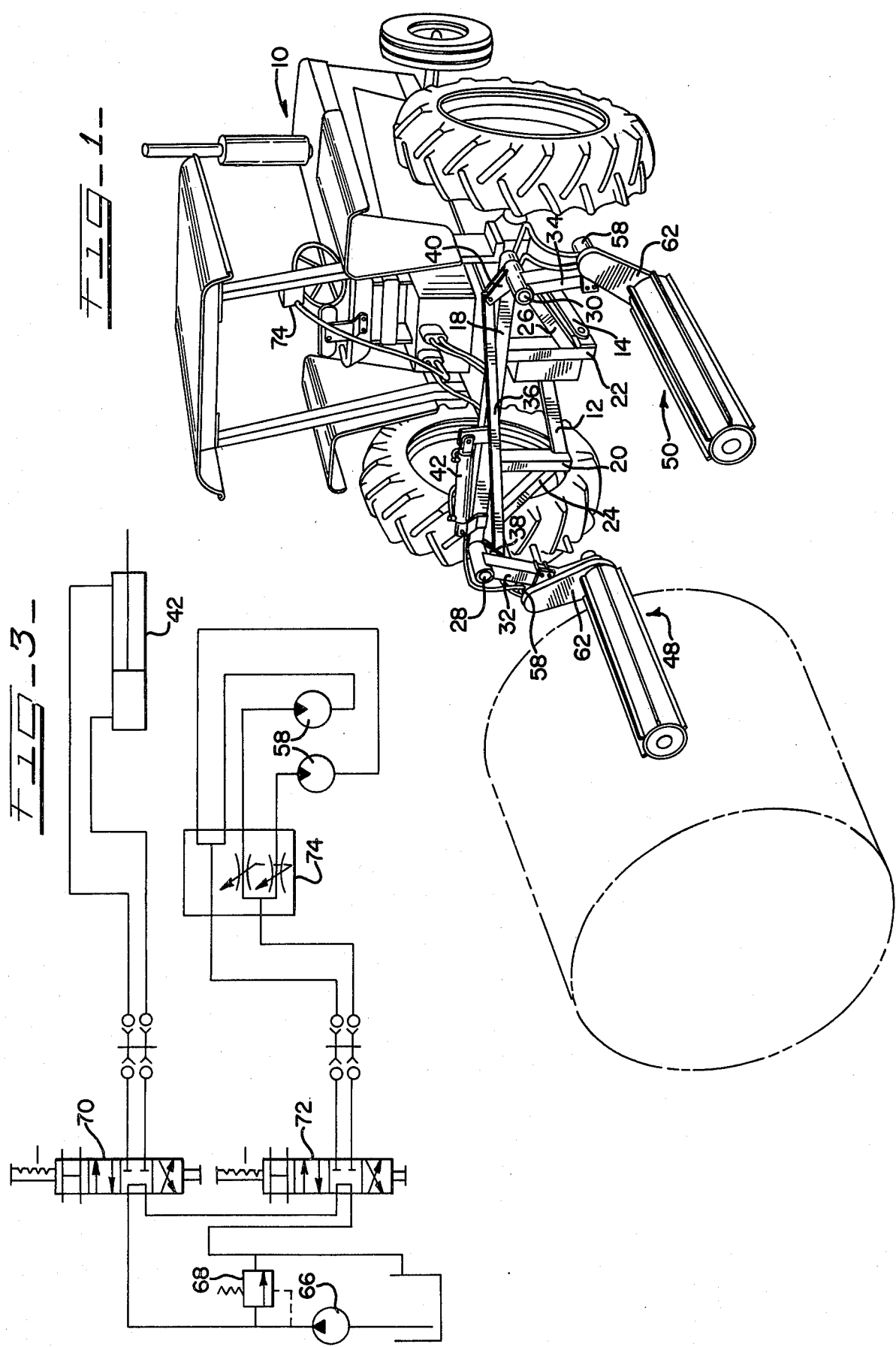

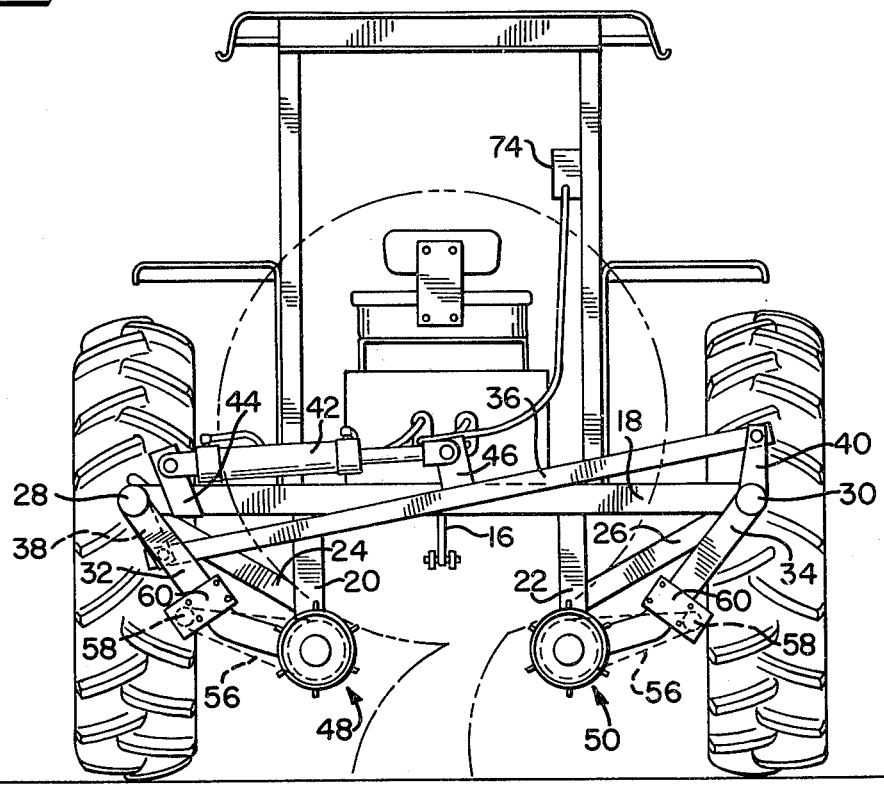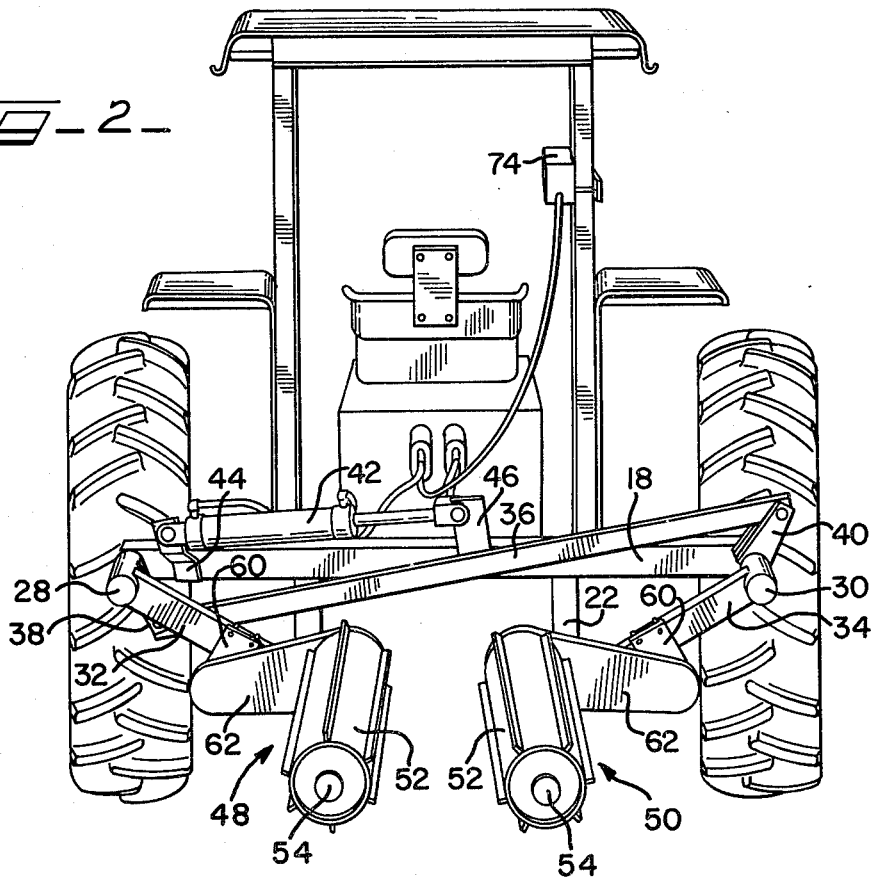

CARRIER AND DISPENSER FOR CYLINDRICAL BALES

BACKGROUND OF THE INVENTION

1. Field of the Invention

The invention relates to handling of cylindrical bales and more particularly to a bale carrier and dispenser or feeder.

2. Prior Art

Machines for carrying and feeding cylindrical bales and shown for example in U.S. Pat. No. 3,968,940 and U.S. Pat. No. 3,874,609.

The most relevant art known to the Applicants consists of a bale carrier and feeder invented by C. E. Turnbow and disclosed in U.S. Pat. No. 4,025,006. The Turnbow patent includes a tractor-mounted U-shaped frame having two rearwardly extending rails 3. Rollers 12 and 14 are mounted on the rails 3 for supporting a bale transversely to the tractor. While a machine of the type shown in the Turnbow patent has been demonstrated in field operation, the manner in which a bale is loaded onto the machine is less than optimum. As apparent in Turnbow's FIG. 3 the rearmost roller must be wedged under the bale and power rotated to lift and move the bale over that roller and ultimately onto both rollers. As a practical matter this procedure requires that the operator coordinate the drive speed of the rear roller with the reverse speed of the tractor. One can visualize how this loading step might entail at least some shreading of hay from the bale. Moreover, this loading procedure requires that each bale be backstopped against rolling. And the machine must include some means such as the skid plates 48 to prevent digging into the ground during bale loading.

Unfortunately, a substantial portion of the bale-engaging and loading structure is hidden from view since it is under the bale being loaded. Due to the lack of visual clues the operator's task is complicated in coordinating the machine operation with that of the tractor itself. And this pertains during full bale unloading as well.

A further problem associated with cylindrical bales, particularly those of substantial size and weight, is that the bale can slump and settle during extended periods resting on the ground. Thus, rather than presenting a uniform cylindrical shape the bale may have a flattened bottom which inhibits subsequent rotational handling of the bale. It can be appreciated that a bale in such a condition will not be so readily rollable onto a device like Turnbow's.

One of the desirable features of a bale handling device is to transport a bale from point to point without unrolling or feeding it out. While the Thurnbow disclosure is silent on this point it is apparent that unloading a full bale would require driving one or more of the rollers to move the bale rearwardly over the rearmost roller. This would involve the control coordination and bale shreading problems set out above with respect to the loading process.

It will be noted that the device uses four hydraulic motors. Hydraulic components and controls are relatively expensive in initial cost and are susceptible to fluid leakage or contamination so as to make maintenance a factor as well. It is desirable therefore to reduce the number of hydraulic components to a minimum commensurate with the capability of the machine to function effectively.

Briefly, the objects of the invention are to provide an improved bale carrier and dispenser which: is capable of handling bales even when they are misshapened due to slump and settling; minimizes bale shreading during bale handling; provides improved visibility during bale handling; is capable of unloading a complete bale if desired; provides a more readily controllable rate of discharge during bale dispensing; and is economical in design and construction.

BRIEF DESCRIPTION OF THE DRAWINGS

FIG. 1 is a perspective view of the carrier and dispenser of the invention mounted on a tractor and in position to load a bale;

FIG. 2 is a rear elevation view of the tractor mounted carrier;

FIG. 3 is a schematic view of the hydraulic control system of the invention; and FIG. 4 is a rear elevation of the carrier showing a cylindrical bale being dispensed.

DESCRIPTION OF THE PREFERRED EMBODIMENT

Referring to the drawings a tractor 10 of the agricultural type includes a conventional three point hitch having lower links 12 and 14 and an upper link 16 (FIG. 4). The carrier and dispenser of the invention includes a rigid frame consisting of a cross beam 18, a pair of downwardly extending legs 20 and 22, and a pair of diagonal braces 24 and 26 respectively interconnecting the legs 20 and 22 with the respective adjacent ends of the beam 18. The lower links 12 and 14 are releasably coupled to the legs 20 and 22 respectively while the upper link 16 is releasably coupled to the cross beam 18.

A pair of spindles 28 and 30 extend rearwardly from opposite ends of the beam 18. Arms 32 and 34 are sleeved onto the spindles 28 and 30 respectively so as to be swingable about parallel pivot axes defined by the spindles. The arms 32 and 34 are interconnected for movement simultaneously towad and away from each other by means including a transversely extending bar 36 pivotally connected to ears 38 and 40 extending downwardly and upwardly respectively from the pivot connections of the respective arms 32 and 34. A double-acting hydraulic cylinder 42 is pivotally connected between a bracket 44 welded to the beam 18 and a plate 46 welded proximate to the middle of the bar 36.

Mounted on the lower ends of the arms 32 and 34 are a pair of rollers 48 and 50. Each of the rollers includes an externally ribbed cylindrical portion 52 journalled by suitable bearings (not shown) about a central spindle 54 secured to the arms 32 and 34. The portion 52 of each of the rollers 48 and 50 is power driven by a chain and sprocket drive depicted at 56 in dotted lines in FIG. 4 driven by a hydraulic motor 58 of the rotary type. The motors 58 are mounted on plates 60 secured to the respective arms 32 and 34 so as to be conveniently disposed out of interference with a bale. Of course each of the chain and sprocket drives 56 is enclosed within suitable shielding 62.

The hydraulic drive and control system is shown schematically in FIG. 3. The internal hydraulic system of the tractor includes the usual reservoir 64, pump 66, relief valve 68, and in the present case two manually operated control valves 70 and 72. The control valve 70 is arranged to selectively actuate the cylinder 42. The control valve 72 is arranged to selectively drive the motors 58 in parallel, either in forward or reverse. The circuit between the control valve 72 and the motors 58 includes a manually adjustable flow divider 74 shown in FIGS. 1, 2 and 4 mounted on the tractor for convenient access to the operator.

In operation the valve 70 is shifted to retract the cylinder 42. This moves the rollers 48 and 50 away from each other as shown in FIG. 1 so as to straddle a bale. The three point hitch is lowered to move the rollers downwardly just above the ground and the tractor is moved rearwardly until the bale is disposed between the rollers. The operator then shifts the valve 70 to extend the cylinder 42 which moves the rollers toward each other and somewhat upwardly in position to carry the bale thereon. The three point hitch is then raised to lift the bale for transport. After some practice a skilled operator accomplishes the foregoing by moving the rollers toward each other while lowering the hitch to get the rollers beneath the bale. The hitch is then raised while the rollers are moved toward each other. It will be appreciated that throughout the loading sequence the operator has a good view of the bale and the position of the rollers with respect to it. And there is no need to drive either of the rollers for bale loading. If it is desired to off load the bale as a unit the above steps are simply conducted in reverse order.

To unroll and feed out the bale as shown in FIG. 4, the operator shifts the control valve 72 to a position driving the motors 58 (after first cutting the twine from the bale when so wrapped). The chain and sprocket drives 56 transmit rotation to the cylindrical portion 52 of the rollers causing the bale supported thereron to rotate about its longitudinal axis. The hay unrolls onto the ground from the bale and is deposited in a windrow for feeding as the tractor is driven forwardly. In most cases the flow divider 74 is set to provide the same flow of pressure fluid to each of the roller drive motors 58 resulting in the same speed of rotation of the rollers. It may be necessary, however, to enhance the feeding of hay from the bale if, for example, a tightly wound bale proves difficult to start unrolling. The provision and convenient location of the flow divider 74 permits the operator to vary the drive speeds of the rollers relative to each other. With reference to FIG. 4 it will be seen that increasing the speed of the roller 50 will create a shreading or tearing action on the bale which induces the outer layer to separate and feed out between the rollers. As the bale decreases in diameter the rollers are moved toward each other to continuously support the bale. In practice a typical bale will feed out until reaching a diameter in the vicinity of 18 to 20 inches. At that point the rollers are stopped and moved apart to deposit the "core" onto the ground.

By the foregoing it will be seen that Applicants have provided an improved and effective carrier and dispenser for cylindrical bales.

What is claimed is:

1. An apparatus adapted for mounting on a mobile unit for dispensing hay from a cylindrical bale, said apparatus comprising:

a frame mountable on the unit and including a transverse main beam having a pair of spindles projecting at right angles therefrom at opposite ends of the beam;

a pair of arms journalled respectively on said pair of spindles and extending generally downwardly therefrom;

a pair of elongated rollers journalled on said arms and projecting at right angles therefrom in spaced parallel relation for releasably holding a cylindrical bale with its longitudinal axis parallel to the rollers;

an elongated bar pivotally and directly interconnecting said arms for moving said arms toward and away from each other in response to moving said bar in one direction and the opposite direction respectively;

a double acting hydraulic cylinder connected between said main beam and said bar for selectively moving said bar in said directions to move said arms toward and away from each other;

a hydraulic motor mounted on each of said arms for driving the respective rollers to rotate a bale thereon about its longitudinal axis; and control means for driving said motors at varying speeds relative to each other whereby a shredding or tearing action may be imparted by the rollers to the bale thereon to enhance dispensing of hay from the bale.

2. An apparatus adapted for mounting on a mobile unit for dispensing hay from a cylindrical bale, said apparatus comprising:

a frame mountable on the unit and including a transverse main beam having a pair of spindles projecting at right angles therefrom at opposite ends of the beam;

a pair of arms journalled respectively on said pair of spindles and extending generally downwardly therefrom;

a pair of elongated rollers journalled on said arms and projecting at right angles therefrom in spaced parallel relation for releasably holding a cylindrical bale with its longitudinal axis parallel to the rollers;

an elongated bar pivotally interconnecting said arms for moving said arms toward and away from each other in response to moving said bar in one direction and the opposite direction respectively;

a double acting hydraulic cylinder connected between said main beam and said bar for selectively moving said bar in said directions;

a hydraulic motor mounted on each of said arms for driving the respective rollers to rotate a bale thereon about its longitudinal axis; and control means for driving said motors at varying speeds relative to each other whereby a shredding or tearing action may be imparted by the rollers to the bale thereon to enhance dispensing of hay from the bale, said contol means includes a flow divider accessible to an operator on said mobile unit for selectively apportioning the flow of hydraulic fluid to said motors.

* * * * *